US008800474B2

(12) United States Patent
Wacker et al.

(10) Patent No.: US 8,800,474 B2
(45) Date of Patent: Aug. 12, 2014

(54) MEASURING GAUGE WITH ADDITIONAL INDICATOR FOR OVERLOADS

(75) Inventors: Peter Wacker, Erlenbach (DE); Bernhard Kastenmeier, Klingenberg (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 0 days.

(21) Appl. No.: 13/287,527

(22) Filed: Nov. 2, 2011

(65) Prior Publication Data

US 2012/0111262 A1 May 10, 2012

(30) Foreign Application Priority Data

Nov. 5, 2010 (DE) .......................... 10 2010 050 340

(51) Int. Cl.
*G01D 13/24* (2006.01)
*G01D 13/26* (2006.01)
(52) U.S. Cl.
CPC ...................................... *G01D 13/26* (2013.01)
USPC ......................................................... 116/293

(58) Field of Classification Search
USPC .................. 116/284, 293, 294, 296, DIG. 27; 73/709; 337/244
See application file for complete search history.

(56) References Cited

U.S. PATENT DOCUMENTS

| 877,314 | A | * | 1/1908 | Fee | 116/293 |
| 1,732,338 | A | * | 10/1929 | Mullen | 116/300 |
| 2,188,816 | A | * | 1/1940 | Rankin | 337/244 |
| 4,196,690 | A | * | 4/1980 | Alinari | 116/293 |
| 2010/0162822 | A1 | * | 7/2010 | Ward | 73/733 |

* cited by examiner

*Primary Examiner* — Daniel S Larkin
*Assistant Examiner* — Irving A Campbell
(74) *Attorney, Agent, or Firm* — WRB-IP LLP

(57) ABSTRACT

A measuring gauge used for measuring and analyzing a physical value includes a measuring element for capturing the physical value, whereby the measuring element moves according to the physical value, a movement that moves a pointer in relation to the motion of the measuring element in a pointer plane around an axis of rotation of the pointer, whereby an additional indicator irreversibly displays the excess beyond a threshold value.

10 Claims, 5 Drawing Sheets

(13) blow-out rear wall with pressure compensation bellows
(3) measuring element
(11') housing with solid baffle wall
(9) dial
(11) window; laminated safety glass
(2) spring stem
(4) connecting shank
(5) movement with interchangeable movement retainer
(8) pointer
(10) sealing
(12) Bayonet ring

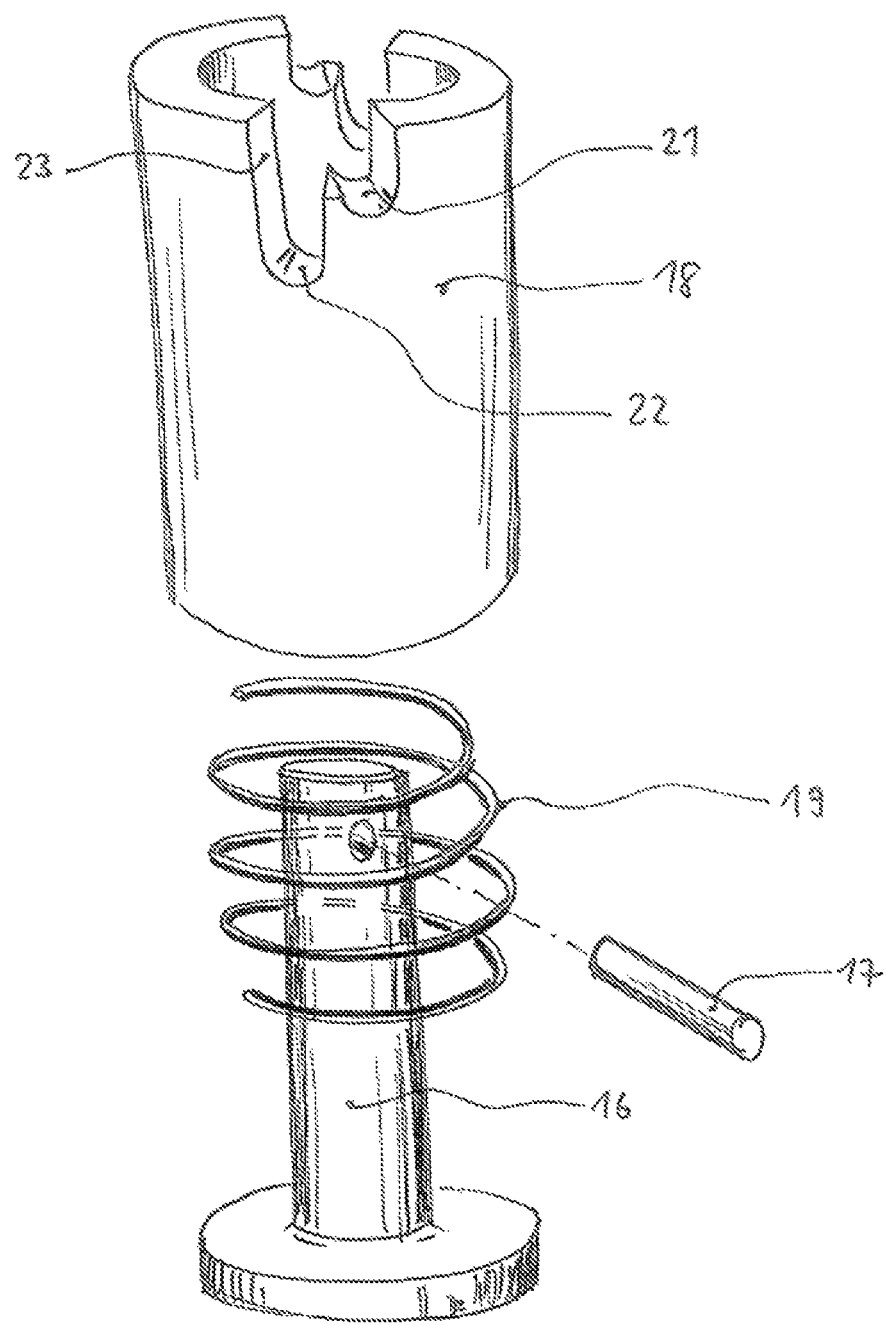

MEASURING GAUGE WITH ADDITIONAL INDICATOR FOR OVERLOADS

BACKGROUND AND SUMMARY

The invention concerns a measuring gauge for measuring and displaying a physical value such as pressure, for example, and more precisely a measuring gauge with at least one drag pointer element that can be coupled to the axis of rotation of a pointer, said drag pointer element being able to bi-stably accommodate 2 states, for example.

Analog rotary displays are known in connection with numerous measuring gauges. These are comprised of simple, decelerated pointers that can be carried along by the main indicator pointer in one direction per stroke and actuator.

This is interesting, for example, for reliably displaying the exceedance of the admissible pressure of a container or an hydraulic pump since this can occur briefly during the absence of the operator or the trained personnel and can go unnoticed. However, such a situation can pose a risk for the continued safe operation of the equipment.

When such a limit is exceeded and the exceedance is displayed, it may be practical or necessary to make it impossible for a single person to simply reset the display. Once the pressure is exceeded, often the safety features of the equipment must be checked or replaced, seals must be repaired or material that escaped must be disposed of safely.

To this end it is advantageous when the exceedance of a maximum limit is displayed clearly and in a mechanically irreversible manner or a reset or shut down or depressurization of the equipment is forced.

However, customary drag pointers are not suitable for this purpose. They can be manipulated or they are not resistant to vibrations. If the exceedance of an admissible value is to be displayed permanently and irreversibly to warn persons or operators of potential dangers, a display is required that reliably records the exceedance of a critical limit.

It is desirable to provide a measuring gauge that irreversibly displays an exceedance of a set or admissible threshold or maximum value in a simple manner.

According to an aspect of the invention a measuring gauge that is used for measuring and analyzing a physical value, comprises a measuring element for capturing the physical value with said measuring element, for example a Bourdon tube or such, moving according to the change of a physical value, i.e. converting a change in the physical value into a motion that can be captured. Furthermore, the measuring gauge comprises a movement that turns a pointer in a pointer plane around an axis of rotation of a pointer in relation to the motion of the measuring element, with the pointer having an actuator.

A drag pointer is spring-loaded and mounted in a pivoting manner in a bushing and can latch into a second recess when moved by the pointer.

To this end the second recess is below the first and thus ensures that the actuator of the main pointer can slide over this position of the second recess without actuating the drag pointer again or being able to move it from the final position.

The measuring gauge according to an aspect of the invention furthermore comprises preferably a dial on which the pointer indicates the physical value based on a measuring value. The drag pointer preferably is fastened below the pointer axis in order to display the exceedance of maximum values. However, it can also be fastened to different locations or to the outside circumference of the dial.

The invention is explained in more detail below based on an exemplary embodiment and reference to the drawings.

BRIEF DESCRIPTION OF THE DRAWINGS

FIG. 5 shows a perspective view of the indicator element in an exploded view.

DETAILED DESCRIPTION

Figure 1:
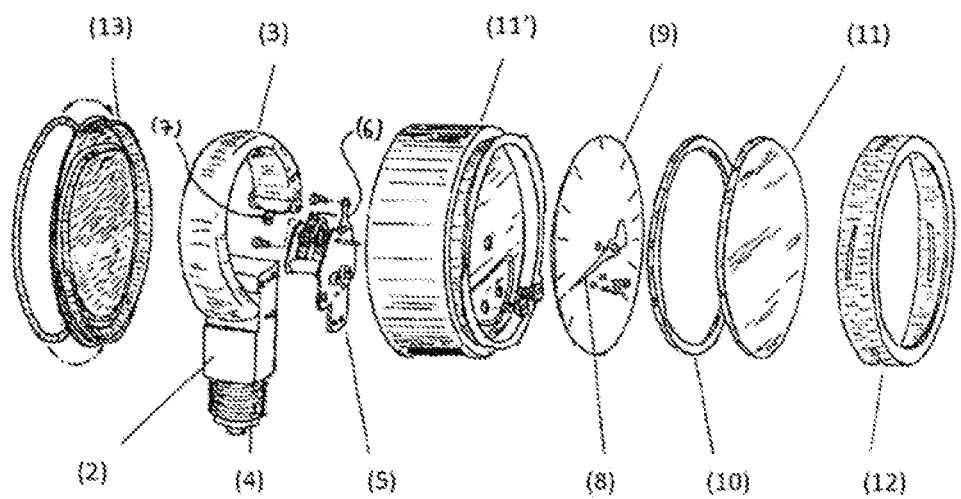
FIG. 1 shows a drawing of a measuring gauge according to the invention as state of the art.

The preferred exemplary embodiment of the measuring gauge according to the invention shown in the view in FIG. 1 shows, among other things, a measuring gauge housing. The main body 11' of the measuring gauge housing 1 is pot-shaped.

Furthermore a spring stem 2 of a Bourdon tube 3 that acts as a measuring element is shown, said spring stem being arranged in the cylinder-shaped main body of the measuring gauge housing when assembled. The spring stem comprises a shank 4 on its bottom side and a movement 5 on its upper side. When assembled, a connecting element 6 of the movement 5 is directly connected to a free end 7 of the measuring element and a pointer 8 of the movement displays the measuring value on a dial 9.

On the front the measuring gauge is covered by a seal 10, window 11 and is closed with a Bayonet ring 12. The removal of such Bayonet rings customarily is carried out manually on site and requires special tools and a high level of force since the high clamping force applied during closing can be applied by a machine, in particular during the manufacturing of the measuring gauge. On the back the gauge optionally comprises a blow-out cover 13 and a seal that opens to the back when the measuring element leaks. However, it also is possible for the back side to be tightly closed.

Figure 2:
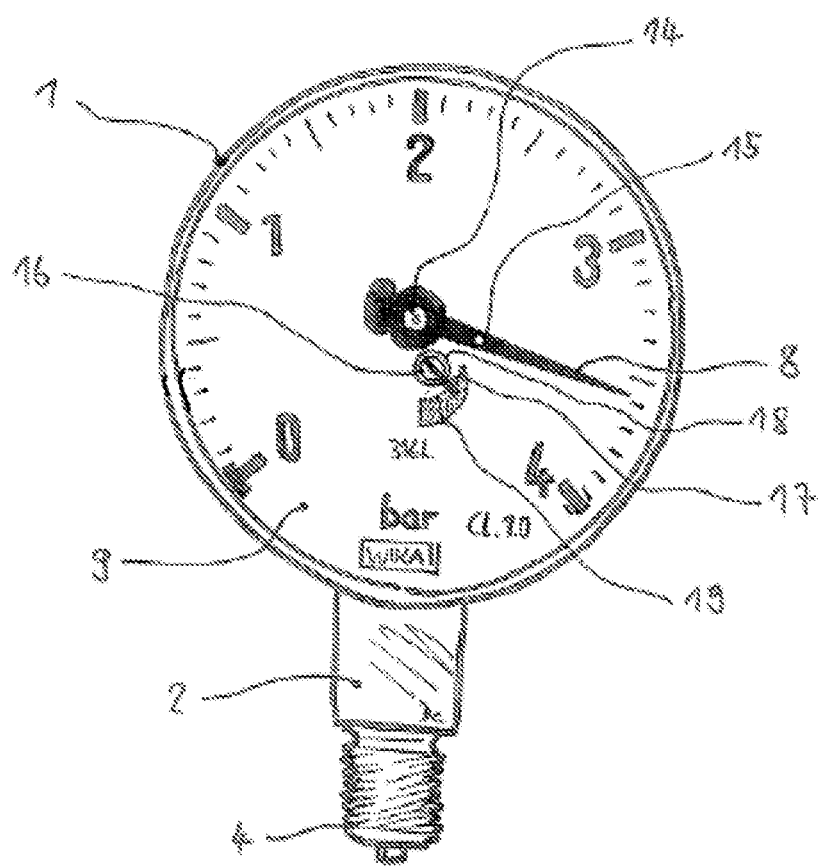
FIG. 2 shows a front view according to the preferred exemplary embodiment.

The preferred exemplary embodiment of the measuring gauge according to the invention shown in FIG. 2 shows the front of the measuring gauge.

The dial 9 that is arranged in the housing 1 comprises a recess in the middle for accommodating the pointer shaft 14. The pointer 8 is fastened to it with the pointer having an actuator 15. The additional gauge for indicating the overload is arranged below the pointer shaft, with the indicator element being comprised of a pointer shank 16 and, fastened to it, an additional pointer 17 that is arranged in a pivoting manner in a bushing 18.

Optionally the additional pointer may have a color marking 19 that optically shows the idle position and a triggered position 20 of the additional pointer.

Figure 3:
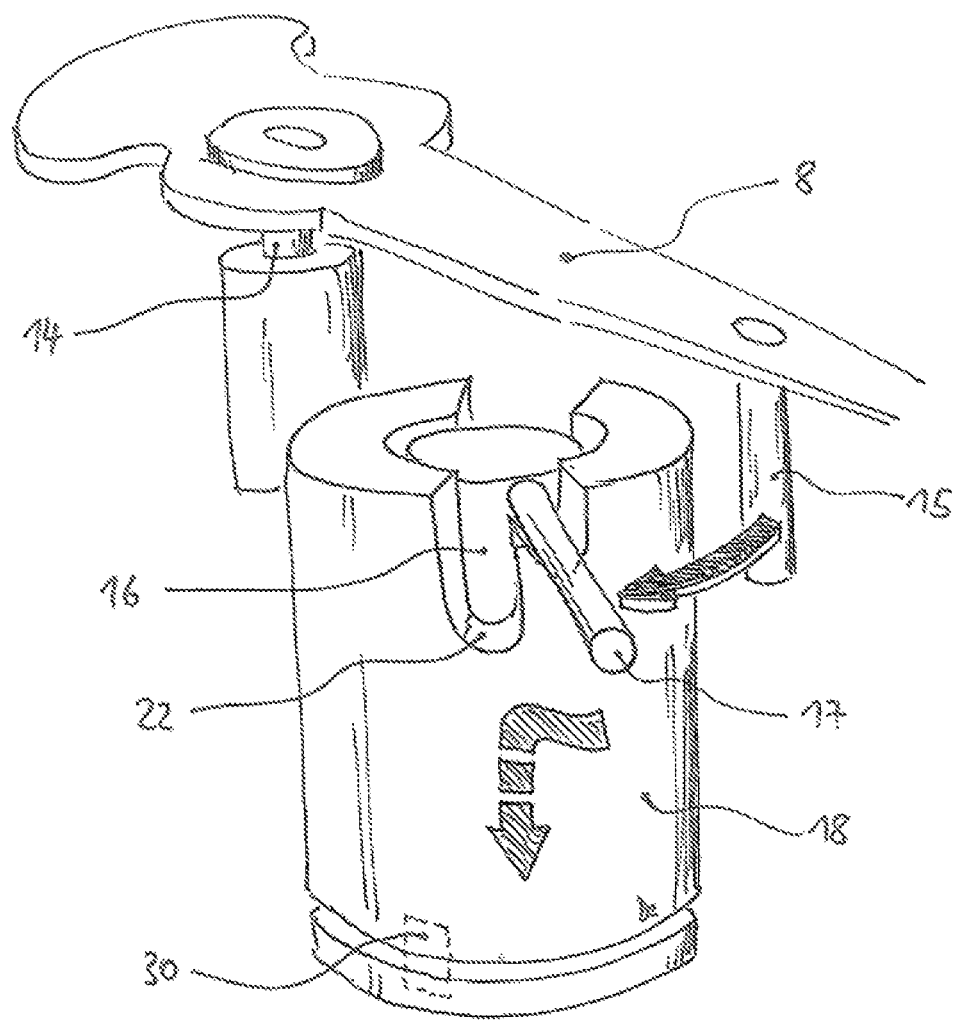
FIG. 3 shows a perspective view of the indicator element in the idle position; shortly before it is triggered by the pointer.

The preferred exemplary embodiment of the measuring gauge according to the invention shown in FIG. 3 shows the additional indicator in the idle position during normal operation. The pointer shank 16 that is arranged in a pivoting manner in a bushing 18, carries the additional pointer 17, said additional pointer resting visibly in a stable idle position in a range of the full scale value or, respectively, in the area of a critical value of the pointer 8 or, optionally, being hidden behind the dial. When the critical value is reached, the actuator 15 makes contact with the additional pointer 17, carries it along during its continued rotary motion, lifts it out of the shown idle position and continues to guide it to the end position 22.

For documentary purposes sealing wax or an adhesive seal can be glued above the pointer shank and the bushing in the area of 30.

Figure 4:
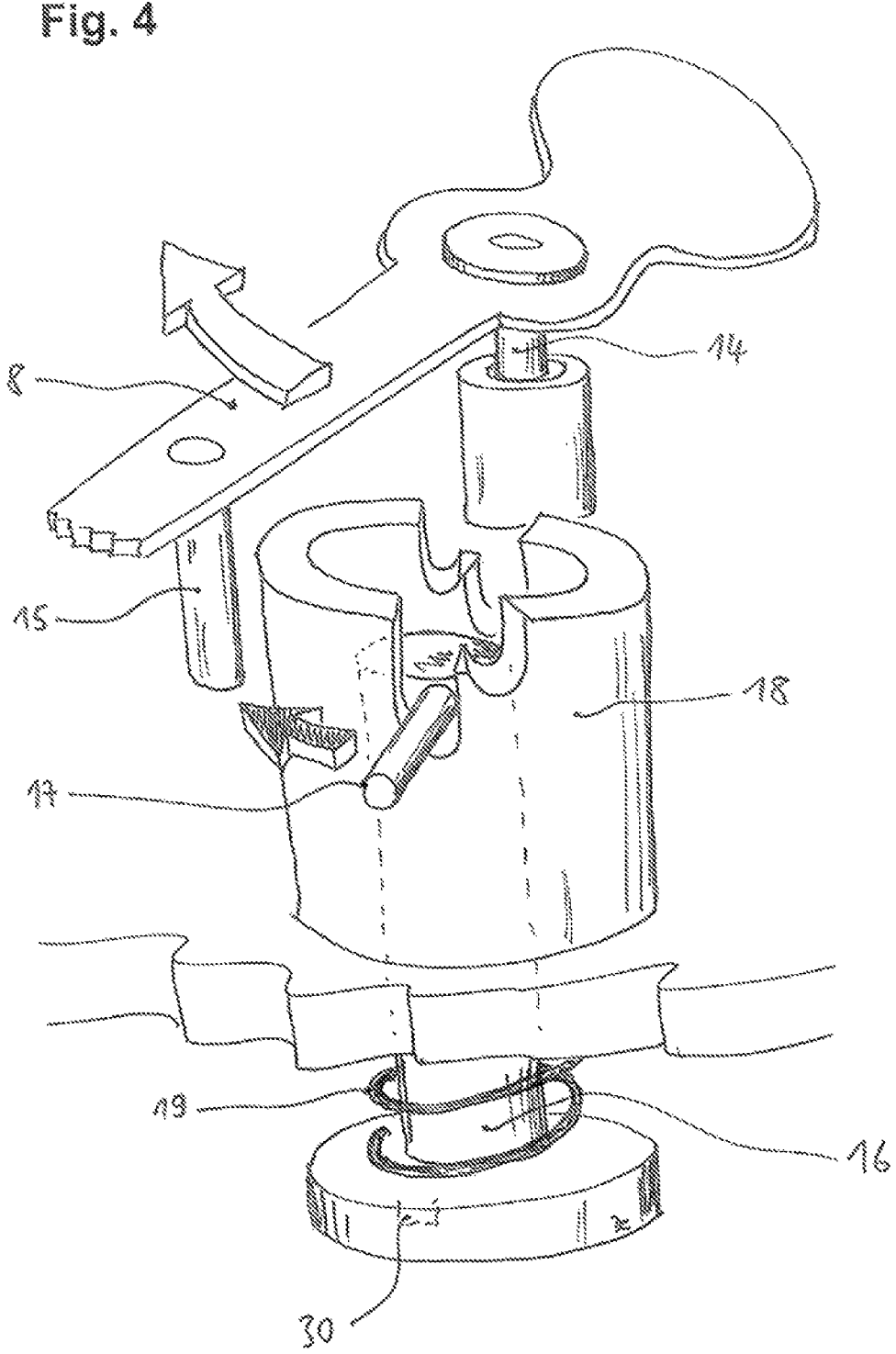
FIG. 4 shows a perspective view of the triggered indicator element or the drag pointer in the end position, respectively, that was triggered by the pointer according to the preferred exemplary embodiment.

The preferred exemplary embodiment of the measuring gauge according to the invention shown in FIG. 4 shows the additional indicator or, respectively, the additional pointer in the triggered end position. The spring 19 that acts on the pointer shank 16 in the process, keeps said pointer shank securely in this end position which, from the point of view of the elevation level is below the idle position level. The additional pointer thus is pivoted out of the effective range of the pointer 8 or its actuator 15.

However, the spring 19 is also suitable for keeping the additional pointer in a pre-stressed state in the idle position.

Even if only triggered once, the additional pointer irreversibly displays any exceedance of a limit value.

Seals 30, if any, are destroyed in the process.

The gauge must be removed, exchanged or opened when the additional indicator is to be reset.

The preferred exemplary embodiment of the measuring gauge according to the invention shown in FIG. 5 shows the disassembled additional indicator.

In this case the pointer shank 16 accommodates the additional pointer in a bore. The additional pointer, as already described, can either go to the idle position 21 or to the end position 22 after it is triggered, both of which are clearly shown again here.

The parts that are shown can be made either of metal or plastic.

If made of plastic, the additional gauge can also be manufactured as a single piece whereby the individual elements can act on each other by means of film hinges.

Furthermore, the spring pre-tension can be realized by means of a plate spring or the entire function can be construed with tilting levers similar to a mouse trap.

Thus the invention concerns a [measuring gauge] for measuring and displaying a physical value, comprising a pivoting pointer shaft and a pointer fastened to said pointer shaft, a pointer drive by means of which the pointer shaft can be rotated from a starting position in relation to the value of the measured value, an actuator that is fastened indirectly or directly to the pointer shaft and participates in the rotation and an indicator element arranged in a mobile manner, whereby the actuator can come in contact with the indicator element when the pointer shaft is rotated from its starting position and carries it along or triggers said indicator element.

This measuring gauge is characterized in that the indicator element is arranged so that it is carried along or triggered by the actuator before reaching a pointer shaft position that corresponds to a set maximum value of the measured value and so that the contact with the actuator is lost when this maximum pointer shaft position is reached and moves into an end position in which the indicator element is or will be fixed.

Preferably the indicator element is irreversibly fixed in its end position.

Furthermore, the measuring gauge preferably comprises a dial with a scale in front of which the pointer is arranged and can furthermore be designed such that the set full scale value of the measured value is assigned to an upper full scale value or is assigned to a set exceedance of the upper full scale value.

The measuring gauge further preferably comprises a pre-tension element that acts on the indicator element and exerts a spring-elastic force on it, which moves the indicator element into its end position and maintains it there, or is characterized in that the indicator element comprises a pointer shank and an additional pointer fastened to it whereby the pointer shank is arranged in a pivoting manner in a bushing.

The pointer shank optionally is arranged in an axially displaceable manner in the busing whereby the bushing comprises a latch recess into which the additional pointer moves while simultaneously moving in axial direction of the bearing shank and is fixed in this manner when the maximum pointer shaft position is reached.

In doing so the axis of rotation of the bearing shank of the display gauge can run coaxially in relation to the pointer shaft or parallel to and at a distance from the axis of rotation of the pointer shaft.

In any case the pointer shank also can be arranged in an axially displaceable manner in the bushing whereby the bushing comprises a latch recess into which the additional pointer moves while simultaneously moving in axial direction of the bearing shank and is fixed accordingly when the maximum pointer shaft position is reached.

This additional manometer for indicating when overpressure is reached that is not permissible for the measuring system or the equipment, can be fastened either to the visible side of the dial, inside the housing or inside an additional, attached housing that can be hidden from the view of the user or operator.

Apart from the use in a manometer other, additional uses are possible for the above described design. For example, the drag pointer design of the additional pointer used in the measuring gauge can be used in any other possible measuring gauge with an analog display. It is sufficient when a pointer element is equipped with an actuator in the widest sense. An actuator can also act magnetically in the form of a small magnet on the pointer or an element fasted behind the dial and act on the additional indicator in the form of a drag pointer device as described above. [sic]

The drag pointer device furthermore can also be evaluated electrically and can be displayed in a control room. It is possible to use the customary 4-20 mA or a digital protocol such as HART for this purpose, whereby the trigger is detected by means of contacts, reed switches or contact-free by means of Hall, GMR, or in a capacitive or inductive manner.

The invention is not limited to the above exemplary embodiment that is described in detail. It can be modified in the scope of the claims below.

The invention claimed is:

1. Measuring gauge for measuring and displaying a physical value, comprising
   a pivoting, pointer shaft and a pointer fastened to the pointer shaft,
   a pointer drive by means of which the pointer shaft can be moved from a starting position in relation to the value of the measured value,
   an actuator that is fastened indirectly or directly to the pointer shaft and participates in the rotation,
   an indicator element arranged in a mobile manner,
   whereby the actuator can come into contact with the indicator element when the pointer shaft is rotated from its starting position and carries along or triggers the indicator element,
   wherein the indicator element is arranged so that is carried along or triggered by the actuator before or when reaching a pointer shaft position that corresponds to a set maximum value of the measured value and in that the contact with the actuator is lost when or after this maximum pointer shaft position is reached and moves into an end position in which the indicator element is fixed, and a pretension element that acts on the indicator element and exerts a spring-elastic force on it, which moves the indicator element to its end position and maintains it there.

2. Measuring gauge according to claim 1, comprising a dial with a scale in front of which the pointer is arranged and in that the set maximum value of the measured value is assigned to an upper full scale value or a set exceedance of the upper full scale value.

3. Measuring gauge according to claim 1, wherein the physical value to be measured is pressure or temperature.

4. Measuring gauge according to claim 1, wherein the pointer drive comprises a measuring element on which the physical value to be measured can be applied and which carries out a motion in relation to this value, and further comprises a movement that converts the motion of the measuring element into the rotation of the pointer shaft.

5. Measuring gauge according to claim 1, wherein the pointer drive including the pointer shaft, the pointer, the actuator and the indicator element together are arranged inside a closed housing.

6. Measuring gauge according to claim 5, wherein the indicator element cannot be manipulated from outside the housing.

7. Measuring gauge for measuring and displaying a physical value, comprising
a pivoting pointer shaft and a pointer fastened to the pointer shaft,
a pointer drive by means of which the pointer shaft can be moved from a starting position in relation to the value of the measured value,
an actuator that is fastened indirectly or directly to the pointer shaft and participates in the rotation, and
an indicator element arranged in a mobile manner,
whereby the actuator can come into contact with the indicator element when the pointer shaft is rotated from its starting position and carries along or triggers the indicator element,
wherein the indicator element is arranged so that is carried along or triggered by the actuator before or when reaching a pointer shaft position that corresponds to a set maximum value of the measured value and in that the contact with the actuator is lost when or after this maximum pointer shaft position is reached and moves into an end position in which the indicator element is fixed,
wherein the indicator element comprises a pointer shank and an additional pointer fastened to it whereby the pointer shank is arranged in a pivoting manner in a bushing,
wherein the pointer shank is arranged in an axially displaceable manner in the bushing whereby the bushing comprises a latch recess into which the additional pointer moves while simultaneously moving in axial direction of the bearing shank and is fixed in this manner when the maximum pointer shaft position is reached, and
wherein the axis of rotation of the bearing shank runs parallel to and at a distance from the axis of rotation of the pointer shaft.

8. Measuring gauge for measuring and displaying a physical value, comprising
a pivoting pointer shaft and a pointer fastened to the pointer shaft,
a pointer drive by means of which the pointer shaft can be moved from a starting position in relation to the value of the measured value,
an actuator that is fastened indirectly or directly to the pointer shaft and participates in the rotation, and
an indicator element arranged in a mobile manner,
whereby the actuator can come into contact with the indicator element when the pointer shaft is rotated from its starting position and carries along or triggers the indicator element,
wherein the indicator element is arranged so that is carried along or triggered by the actuator before or when reaching a pointer shaft position that corresponds to a set maximum value of the measured value and in that the contact with the actuator is lost when or after this maximum pointer shaft position is reached and moves into an end position in which the indicator element is fixed,
wherein the indicator element comprises a pointer shank and an additional pointer fastened to it whereby the pointer shank is arranged in a pivoting manner in a bushing,
wherein the pointer shank is arranged in an axially displaceable manner in the bushing whereby the bushing comprises a latch recess into which the additional pointer moves while simultaneously moving in axial direction of the bearing shank and is fixed in this manner when the maximum pointer shaft position is reached, and
wherein the actuator is fastened to the pointer and is bound to make contact with the additional pointer.

9. Measuring gauge for measuring and displaying a physical value, comprising
a pivoting pointer shaft and a pointer fastened to the pointer shaft,
a pointer drive by means of which the pointer shaft can be moved from a starting position in relation to the value of the measured value,
an actuator that is fastened indirectly or directly to the pointer shaft and participates in the rotation, and
an indicator element arranged, in a mobile manner,
whereby the actuator can come into contact with the indicator element when the pointer shaft is rotated from its starting position and carries along or triggers the indicator element,
wherein the indicator element is arranged so that is carried along or triggered by the actuator before or when reaching a pointer shaft position that corresponds to a set maximum value of the measured value and in that the contact with the actuator is lost when or after this maximum pointer shaft position is reached and moves into an end position in which the indicator element is fixed, wherein the indicator element comprises seal elements that are glued on and that are destroyed when the indicator element is triggered.

10. Measuring gauge according to claim 9, wherein the indicator element is irreversibly fixed in its end position.

* * * * *